US006243805B1

United States Patent
Mahurin

(10) Patent No.: US 6,243,805 B1
(45) Date of Patent: Jun. 5, 2001

(54) PROGRAMMING PARADIGM AND MICROPROCESSOR ARCHITECTURE FOR EXACT BRANCH TARGETING

(75) Inventor: Eric W. Mahurin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/132,640

(22) Filed: Aug. 11, 1998

(51) Int. Cl.[7] .................................................. G06F 13/00
(52) U.S. Cl. ...................... 712/233; 712/220; 712/234; 712/235; 712/236; 712/237; 712/217; 714/767
(58) Field of Search ................... 712/201, 217, 712/219, 234–239, 220, 233

(56) References Cited

U.S. PATENT DOCUMENTS

| | | | |
|---|---|---|---|
| 3,577,189 | * 5/1971 | Cocke | 712/219 |
| 4,674,063 | * 6/1987 | Sato | 712/234 |
| 4,777,587 | * 10/1988 | Case et al. | 712/235 |
| 5,142,634 | * 8/1992 | Fite et al. | |
| 5,404,470 | * 4/1995 | Miyake | |
| 5,469,449 | * 11/1995 | Park | 714/767 |
| 5,471,591 | * 11/1995 | Edmondson et al. | 712/235 |
| 5,664,135 | * 9/1997 | Schlansker et al. | 712/201 |
| 5,796,997 | * 8/1998 | Lesartre et al. | |
| 5,799,167 | * 8/1998 | Lesartre | |
| 5,799,180 | * 8/1998 | Shiell et al. | |
| 5,805,853 | * 9/1998 | White et al. | |
| 5,857,104 | 1/1999 | Natarjan et al. | |
| 5,909,573 | 6/1999 | Sheaffer | |
| 5,949,995 | 9/1999 | Freeman | |
| 5,954,815 | * 9/1999 | Joshi et al. | |
| 6,092,188 | 7/2000 | Corwin et al. | |

OTHER PUBLICATIONS

McFarling, "Combining Branch Predictors," WRL Technical Note TN–36, Jun. 1993, pp. 1–20.*
Schlansker, et al., "Achieving High Levels of Instruction–Level Parallelism with Reduced Hardware Complexity," HPL–96–120, Computer Research Center, Nov. 1994, pp. 1–85.

* cited by examiner

Primary Examiner—Meng-Al T. An
Assistant Examiner—Wen-Tai Lin
(74) Attorney, Agent, or Firm—Conley, Rose & Tayon, PC; Lawrence J. Merkel

(57) ABSTRACT

A microprocessor for executing exact branch targeting is disclosed. A microprocessor contains a fetch stage for fetching and receiving instructions from memory at a memory address specified by a program counter. The instructions received by the fetch state include conditional branch instructions and conditional branch calculation instructions. The conditional branch calculation instructions underlie the conditional branch instructions in that the conditional branch is taken or not depending upon the results of the conditional branch calculation instructions. An execution stage within the microprocessor executes the conditional branch calculation instructions once decoded by a decode stage. Once executed, the execution stage writes the results thereof into a branch FIFO buffer contained within a branch target circuit coupled to the fetch stage. Subsequent thereto, the fetch stage receives a conditional branch instruction. In response thereto, the fetch stage accesses the branch FIFO buffer to read a result of a prior conditional calculation instruction result stored therein. The result determines whether the fetch stage dispatches a target address to the program counter or whether the program counter is to be incremented by a predefined fixed integer.

21 Claims, 4 Drawing Sheets

PROGRAMMING PARADIGM AND MICROPROCESSOR ARCHITECTURE FOR EXACT BRANCH TARGETING

BACKGROUND OF THE INVENTION

1. Field of the Invention

The present invention relates to the field of microprocessors and, more particularly, a method and circuit for exact branch targeting.

2. Description of the Relevant Art

Pipelined microprocessors achieve high performance by executing an instruction per clock cycle and by choosing the shortest possible clock cycle consistent with the design. As used herein, the term "clock cycle" refers to an interval of time accorded to various stages of the instruction processing pipeline within the microprocessor. Storage devices (e.g., registers) capture values according to the clock cycle. For example, a storage device may capture a value according to a rising or falling edge of a clock signal defining the clock cycle. The storage device then stores the value until the subsequent rising or falling edge of the clock signal, respectively.

The term "instruction processing pipeline" is used herein to refer to the logic circuits employed to process instructions in a pipelined fashion. The pipeline may be divided into any number of stages at which portions of the instruction processing are performed. The pipeline may include (1) a fetch stage for fetching the instruction, (2) a decode stage for decoding the instruction, (3) an execution stage for executing the instruction, and (4) a write back stage for writing the execution results in the destination identified by the instruction.

Many microprocessors employ a branch prediction mechanism. The branch prediction mechanism indicates a predicted direction (taken or not taken) for a conditional branch instruction, allowing subsequent instruction fetch to continue within the predicted instruction stream indicated by the branch prediction prior to actual resolution of the conditional branch instruction. The predicted instruction stream includes instructions immediately subsequent to the branch instruction in program order if the branch instruction is predicted not taken, or the instructions at the target address of the branch instruction if the branch instruction is predicted taken. Instructions from the predicted instruction stream may be speculatively executed prior to execution and resolution of the branch instruction, and in any case, are placed into the instruction processing pipeline prior to execution of the branch instruction. If the predicted instruction stream is correct, then the number of instructions executed per clock cycle is advantageously increased. However, if the predicted instruction stream is incorrect (i.e., one or more branch instructions are predicted incorrectly), then the instructions from the incorrectly predicted instruction stream are discarded or purged from the instruction processing pipeline and the number of instructions executing per clock cycle is decreased.

Clearly, branch misprediction and the stalling that ensues is contrary to the goal of executing the most instructions per clock cycle in addition to the goal of keeping the pipeline full. There are several alternatives to employing a branch prediction mechanism for handling conditional branch instructions. The easiest alternative is to freeze the pipeline, holding any instructions after the branch until the conditional branch instruction is resolved and the branch destination is known. The attractiveness of this solution lies primarily in its simplicity. However, this solution requires that the stages prior to the execution stage remain empty until the conditional branch instruction is executed. A better and only slightly more complex solution is to always fetch the next instruction in program order as if the conditional branch is not taken. If the branch is taken, however, this alternative requires that the pipeline be flushed and the fetch restarted at the address at which the branch is taken. Another alternative, yet similar approach, is to always presume the branch as taken. Again, problems arise if the branch is not taken.

Some microprocessors employ another alternative to branch prediction mechanisms called delay branching. In delay branching, the compiler places the branch instruction earlier in the instruction stream. The instruction slots between the initial position of the branch instruction and the new position provided by the compiler for the branch instruction are provided with instructions which are independent of the branch instruction, valid, and useful. For example, the conditional branch instruction may be compiled so that four independent, valid, and useful instructions execute after the conditional branch instruction is fetched. Presuming the pipeline to be four stages long, the conditional branch instruction can be evaluated ahead of time so that no prediction occurs. In delayed branching, the branching instruction executes in the cycle it would have been fetched in the original instruction stream.

One problem with delayed branching is that delay branching cannot be implemented in existing x86 code. Delayed branching must use a modified instruction set. However, it appears that delay branching can be implemented in existing x86 instruction set if the microcode program is adequately modified. Another problem associated with delayed branching relates to superscalar microprocessors which have several pipelines. If the branch instruction is moved up to an early position within the instruction stream by the compiler, the branch instruction may not execute in the execute stage at the appropriate time since superscalars can execute multiple instructions simultaneously. This is particularly problematic with respect to loops where the entire loop can be executed in one clock cycle. In other words, superscalar microprocessors may limit the positions at which the branch instruction can be moved. If the branch instruction cannot be moved far enough up into the instruction stream, the pipeline may have to be operated with no OPs to compensate for the limitation. Executing no OPs limits microprocessor operating speed.

SUMMARY OF THE INVENTION

The problems identified above are in large part addressed by a microprocessor having a branch target circuit coupled to a fetch stage, wherein the branch target circuit includes a branch FIFO buffer configured to receive and store results of executing decoded conditional branch calculation instructions. The results identify whether a subsequent conditional branch instruction is taken or not. The fetch stage is configured to fetch and receive instructions from main memory at addresses specified by program counter. When the fetch stage receives a conditional branch instruction, the branch FIFO buffer is accessed to read the results of a previously executed conditional branch calculation instruction. The result identifies whether a target address contained within the conditional branch instruction is dispatched to the program counter (i.e., the conditional branch is taken) or whether the program counter is to be incremented by a fixed integer (i.e., the branch is not taken).

In one embodiment, the microprocessor contains an execution stage which is configured to write the results of executing the decoded conditional branch calculation instructions into the branch FIFO buffer. The execution stage writes the result prior to the fetch stage receiving the conditional branch instruction which depends upon the results stored within the FIFO buffer.

In another embodiment of the present invention, the conditional branch instruction includes a dedicated bit, which is used for reading the branch FIFO buffer. In other words, when the dedicated bit is set, the fetch stage accesses the branch FIFO buffer to read the results of a previously executed conditional branch calculation instruction. If the dedicated bit is not set, the fetch stage does not access the branch FIFO buffer.

In another embodiment of the present invention, the branch target circuit includes a stall circuit configured to receive a signal from the branch FIFO buffer indicating that the branch FIFO buffer is empty. The stall circuit generates a stall signal upon notice that the branch FIFO buffer is empty. This signal directs the fetch stage to delay dispatching a target address contained within conditional branch instruction until the result upon which the conditional branch instruction depends, is available within the branch FIFO buffer.

One advantage of the present invention is that it eliminates branch prediction mechanisms and speculative instruction execution based upon the branch predictions.

Another advantage of the present invention is that it provides exact branch targeting at the fetch stage of a processing pipeline.

BRIEF DESCRIPTION OF THE DRAWINGS

Other objects and advantages of the invention will become apparent upon reading the following detailed description and upon reference to the accompanying drawings in which.

Figure 1:
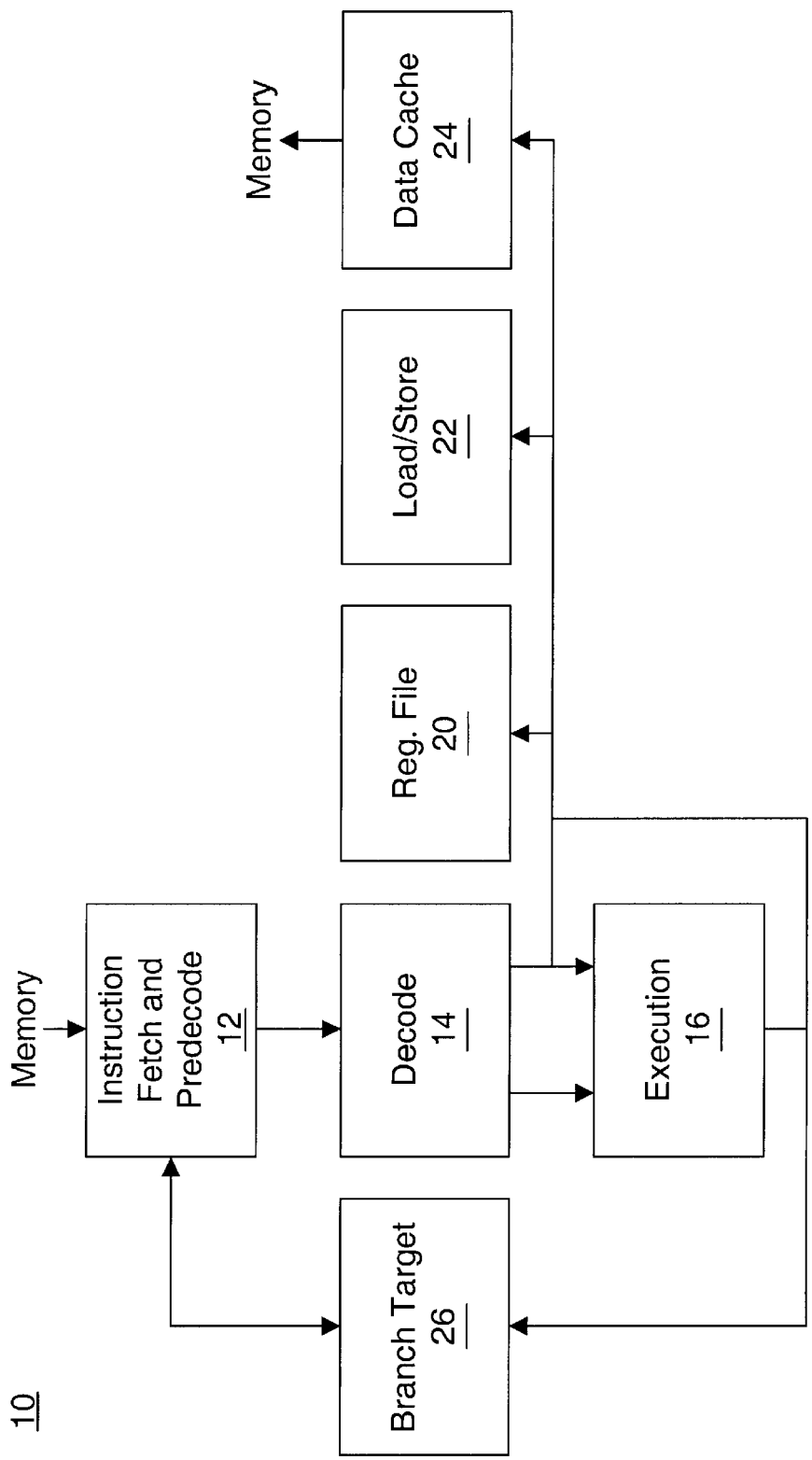
FIG. 1 is a block diagram of a microprocessor employing the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a pipelined microprocessor 10 implementing one embodiment of the present invention. FIG. 1 shows a single pipeline. However, the present invention should not be limited to usage therein. Rather, it is contemplated that the present invention can be implemented in a superscalar architecture having multiple pipelines.

Microprocessor 10 includes an instruction fetch and predecode stage 12 coupled to receive program instructions from memory (not shown), decode stage 14, execution stage 16, register file 20, load store unit 22, data cache 24, and branch target circuit 26.

Instruction fetch and predecode stage 12 is coupled to fetch and receive instructions from memory, as described above, in addition to predecoding the received instructions as will be more fully described below. Instruction fetch and predecode stage 12 can fetch program instructions either from main memory or an instruction cache, neither of which are shown in FIG. 1. Instruction fetch and predecode stage 12 fetches instructions according to addresses specified by a program counter which, in one embodiment, is contained within instruction fetch and predecode 12. Instructions fetched by instruction fetch predecode stage 12 include conditional branch instructions and conditional branch calculation instructions.

In one embodiment, the conditional branch instruction may redirect the stream of program instructions according to the results of a previously executed conditional branch calculation instruction. Is noted that the conditional branch calculation instruction can be defined by two sequential instructions, the first which calculates a result of a condition test, the second which writes the result to the branch target 26 as will be more fully described below. In one embodiment, the conditional branch instruction may dispatch a target address contained therein to the program counter thereby redirecting the stream of the program, or the conditional branch instruction may direct the microprocessor to increment the program counter by a fixed integer thereby continuing the current stream of instructions. The decision to dispatch the target address or to increment the program counter depends on the results of a previously execution conditional branch calculation instruction.

Generally, conditional branch calculation instructions test a condition. For example, a conditional branch calculation instruction may direct microprocessor 10 to compare operands in register file 12 to determine if they are equal. A logical one may be generated as a result if, for example, the operands are equal. A logical zero may be generated as a result if the operands are not equal.

Decode stage 14 is coupled to instruction fetch and predecode 12. Decode stage 14 is configured to receive instructions fetched and possibly predecoded by instruction fetch and predecode stage 12. Decode unit 14 is configured to decode the instructions received from instruction fetch and predecode unit 12. Register operand information is detected and routed to register file 20. Additionally, if the instructions require one or more memory operations to be performed, decode unit 14 dispatches the memory operations to load store unit 22. Each instruction is decoded to a set of control values for execution unit 16. The control values are dispatched to execution unit 16 along with operand address information and displacement or immediate data which may be included with the instruction.

Execution unit 16 is configured to perform arithmetic operations of addition and subtraction, as well as shifts, rotates, logical operations, etc. The operations are performed in response to the control values decoded for the particular instruction by decode unit 14. It is noted that a floating point unit (not shown) may also be employed to accommodate floating point operations. Among the operations performed by execution stage 16 is the execution of the abovementioned conditional branch calculation instruction. The execution unit 16 receives the corresponding control values from decode stage 14 in addition to data from register file 20 or data cache 24. In response, execute stage 16 tests conditions specified by the instructions.

Results produced by the execution stage 16 are sent to register file 20 if a register value is to updated, and to load store unit 22 if the contents of a memory location are to be changed. Execution stage 16 also produces results of executing the conditional branch calculation instructions, which are subsequently provided to branch target circuit 26.

Load store unit 22 provides an interface between execution stage 16 and data cache 24. In one embodiment, load store unit 22 may be configured with multiple storage locations for data and address information for pending loads or stores. A memory operation is a transfer of data between microprocessor 10 and main memory. Memory operations may be the result of an instruction which utilizes an operand stored in memory, or may be the result of a load store instruction which causes the data transfer, but no other application. Additionally, load store unit 22 may include special registers such as segment registers or other registers related to the address translation mechanism defined by the x86 microprocessor architecture.

Data cache 24 is a high speed cache memory provided to temporarily store data being transferred between load store unit 26 and main memory. Data cache 24 may be implemented in a variety of specific memory configurations.

Figure 2:
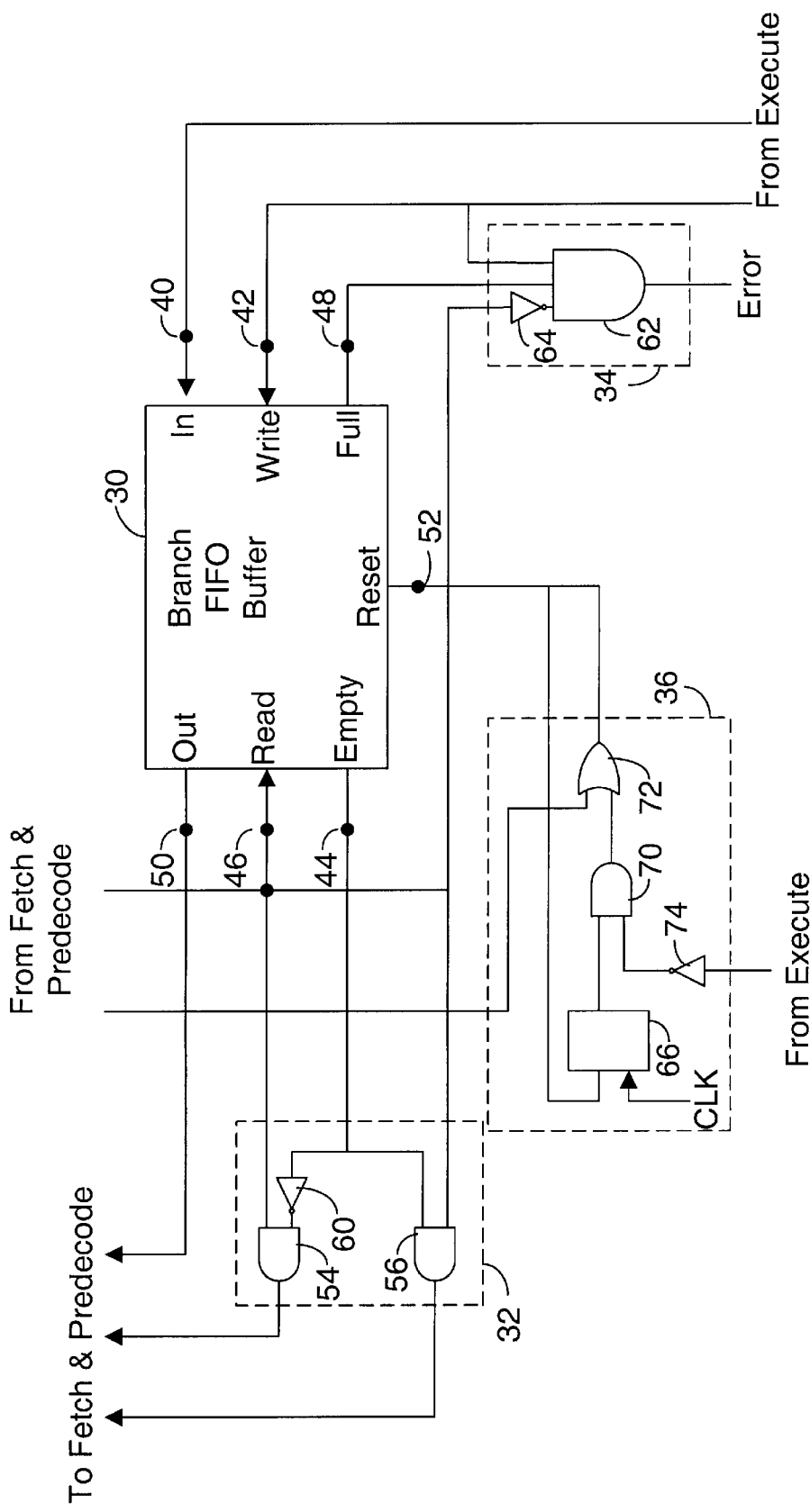
FIG. 2 is a block diagram of the branch target circuit shown in FIG. 1.

FIG. 2 is a diagram illustrating branch target circuit 26 of FIG. 1. Branch target circuit 26 includes a branch FIFO buffer 30, stall circuit 32, error circuit 34, and reset circuit 36. Branch FIFO buffer 30 includes a plurality of input and output nodes. Result input node 40 is coupled to execution stage 16 (not shown in FIG. 2) and configured to receive the results of executing the conditional branch calculation instructions described above. Write node 42 is likewise coupled to execution stage 16 and is configured to receive a signal therefrom in response to executing the conditional branch calculation instruction. The signal provided to write node 42 directs branch FIFO buffer to store a concurrent conditional branch calculation result provided to result input node 40. Branch FIFO buffer 30 monitors available storage space contained therein and generates a signal at output node 48 when branch FIFO buffer is full. Likewise, branch FIFO buffer 30 monitors its storage to determine whether no data is contained therein. When this empty condition exists, a signal is generated at output node 44 accordingly. Instruction fetch and precode stage 12 (not shown in FIG. 2) accesses branch FIFO buffer 30 with a signal provided to read input node 46. In response to receiving the signal from instruction fetch and precode stage 12, branch FIFO buffer outputs a result of a previously executed conditional branch calculation instruction at result output node 50. The result is received by instruction fetch and precode stage 12 which dispatches a target address or increments a program counter, depending on the value of the result output by branch FIFO 30. Lastly, branch FIFO 30 includes a reset input node 52. In response to receiving a signal at reset input node 52, branch FIFO buffer 30 is cleared. As will be more fully described below, branch FIFO buffer 30 is cleared in response to a clear instruction received by instruction fetch and precode circuit 12.

Stall circuit 32 includes a pair of AND gates 54, 56, and an inverter 60. The output of inverter 60 is coupled to one input of AND gate 54 while the input of inverter 60 is coupled to node 44 of branch FIFO buffer 30. The other input of AND gate 54 is coupled to the read input node 46 of branch FIFO buffer 30. One input of AND gate 56 is likewise coupled to the read result input node 46 branch FIFO buffer 30, while the other input of AND gate 56 is coupled to output node 44. The output of AND gate 54 is configured to generate a signal directing instruction fetch and predecode stage 12 to dispatch a target address contained within a conditional branch instruction to the program counter. Similarly, the output of AND gate 56 generates a signal directing instruction fetch and predecode stage 12 to stall or delay dispatching a target address contained within a conditional branch instruction to the program counter. It is imperative that instruction fetch and predecode stage 12 does not falsely interpret an empty branch FIFO buffer 30. As was noted above, the result of executing the conditional branch calculation instruction may be a logical one when the underlying condition of tests is true or the result may be a logical zero if the underlying test is false. If the branch FIFO buffer 30 is empty when accessed by instruction fetch and predecode stage 12, a logical zero could be outputted at node 50 which may falsely interpret the underlying conditional test is false. Stall circuit 32 prevents such erroneous interpretation of the branch FIFO buffer 30 by stalling the dispatch of a target address to the program counter when a branch FIFO 30 is empty.

Error circuit 34 includes AND gate 62 and inverter 64. The input of inverter 64 is coupled to the read input node 46 while the output of inverter 64 is coupled to one input of AND gate 62. A second input of AND gate 62 is coupled to output node 48 of branch FIFO buffer 30. A third input of AND gate 62 is coupled to input node 42 of branch FIFO buffer 30. The output of AND gate 62 is configured to generate an error signal when execution stage 16 attempts to write a conditional branch calculation result into branch FIFO 30 when branch FIFO buffer 30 full. More particularly, when branch FIFO 30 is full, branch FIFO 30 generates a signal indicative thereof at output node 48. During a clock cycle in which the instruction fetch predecode stage 12 is not reading from the branch FIFO buffer and when the execution stage 16 is writing to a full branch FIFO buffer 30, error signal is generated by AND gate 62.

Reset circuit 36 includes latch 66, AND gate 70, OR gate 72, and inverter 74. The output of OR gate 72 is coupled to reset input node 52. One input of OR gate 72 is coupled to instruction fetch and predecode stage 12 and is configured to receive a logical one when instruction fetch and predecode stage 12 receives a clear branch of FIFO instruction. The other input of OR gate 72 is coupled to the output AND gate 70. One input of AND gate 70 is coupled to the output of latch 66. The other input of AND gate 70 is coupled to inverter 74 which in turn is coupled to execution stage 16. AND gate 70 is configured to receive a logical one when execution stage 16 executes a clear FIFO buffer instruction. Latch 66 has an input coupled to reset input node 52 and is configured to generate a logical one when a logical one is clocked in. Reset circuit 36 generates a pulse which is subsequently provided to branch FIFO buffer 30 via reset input node 52. The rising edge of the pulse is triggered in response to instruction fetch and predecode stage 12 receiving the clear branch FIFO instruction. The inputs to AND gate 70 remain logical one until execution stage 16 executes the clear branch FIFO instruction at which point the output of AND gate 70 inverts to a logical zero. When the clear branch FIFO instruction moves out of the instruction fetch and predecode stage 12, both inputs to OR gate are zero. Accordingly, the output of OR gate 72 inverts to a logical zero which in triggers the end of the cycle of the branch FIFO reset. The transition to logical zero at input node 52 is latched by latch 66 which maintains input node 52 at logical zero until a subsequent clear branch FIFO instruction is received by instruction fetch and predecode stage 12.

Figure 3:
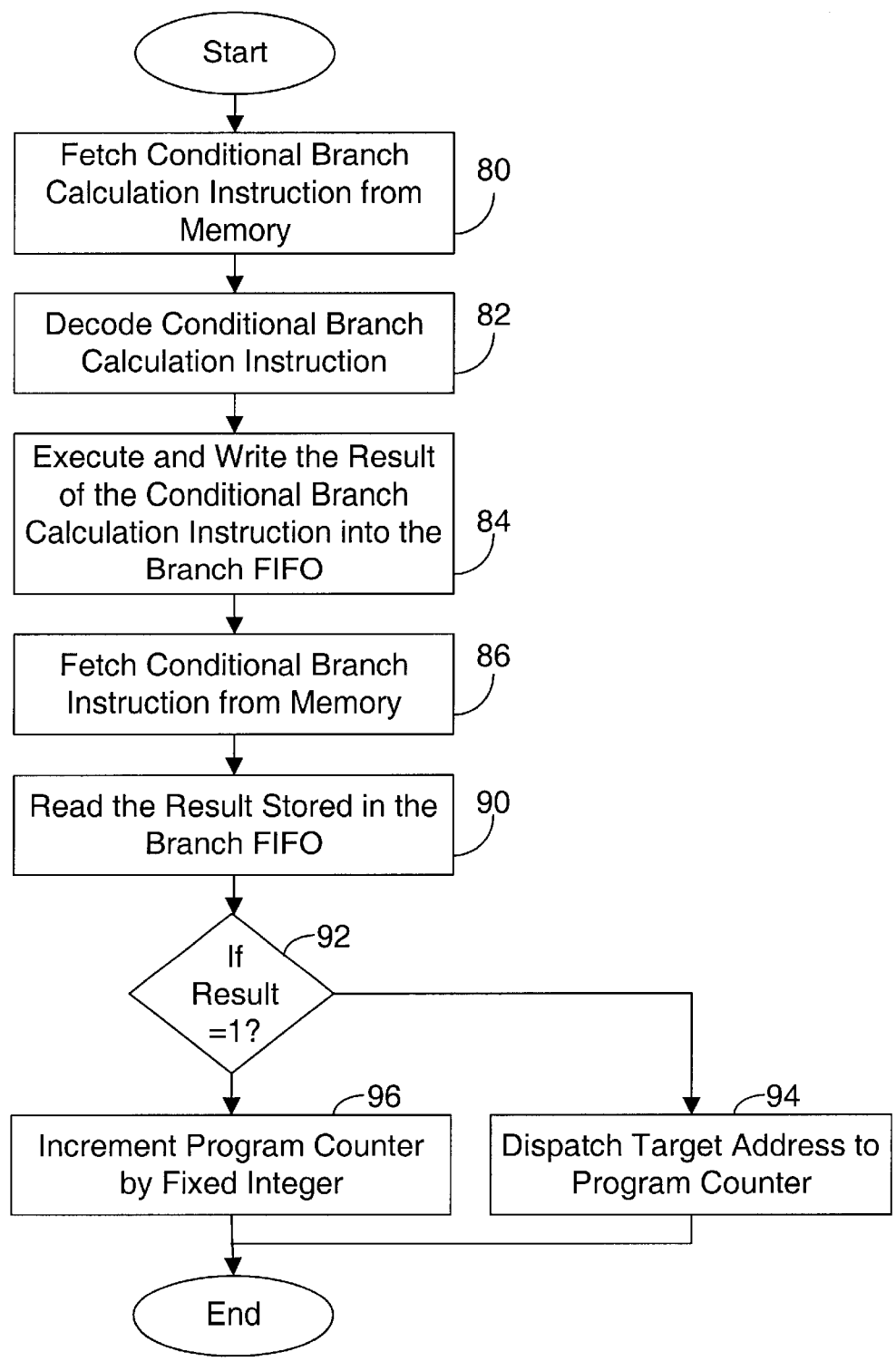
FIG. 3 is a flow chart showing operational aspects of the microprocessor and the target circuit shown in FIGS. 1 and 2.

FIG. 3 is a flow chart illustrating operational aspects of the microprocessor 10 shown in FIG. 1 and the branch target circuit 26 shown in FIG. 2. In step 80, instruction fetch and predecode stage 12 fetches and receives a conditional branch calculation instruction from memory. The conditional branch calculation instruction, as noted above, when executed, tests a condition to determine whether a subsequent conditional branch instruction should be taken or not (i.e., whether a target address should be dispatched to the program counter or whether the program counter should be implemented by a fixed integer). In step 82, decode stage 14 receives the conditional branch calculation instruction and generates the necessary control values for execution stage 16. Additionally, operand information needed for executing the conditional branch calculation instruction is detected and routed to register file 20 or load store 22. In response, register file 20 or data cache 24 output the needed operands to execution stage 16 for subsequent processing. In step 84, execution unit 16 executes the conditional branch calculation instruction and writes the result thereof into branch FIFO buffer 30. As noted above, the result could be, in one embodiment, a logical one which indicates that the underlying conditional test of the instruction is valid or true, or a logical zero which indicates the underlying conditional test is invalid or false.

In step 86, the conditional branch instruction is fetched from memory by instruction fetch in predecode stage 12. It is noted that there are several instructions separating the conditional branch instruction and the underlying conditional branch calculation instruction. Normally, the number of instructions relate to the size of the microprocessor pipeline. For example, if there are three stages separating the fetch stage and the execution stage, the conditional branch and conditional branch calculation instructions may be separated by at least three independent, valid and useful instructions. Upon receipt of the conditional branch instruction, fetch and predecode stage 12 detects a dedicated bit within the instruction, which, if set, accesses the branch FIFO buffer 30 to output the result of a previously executed conditional branch calculation instruction. To this extent, the conditional branch instruction is predecoded and in response thereto, fetch and precode circuit 12 generates a signal which is received at read result input node 46 shown in FIG. 2.

At step 92, instruction fetch and predecode stage 12 receives the result from the branch FIFO buffer and responds accordingly. In other words, if the result is a logical one indicating the underlying conditional test is valid or true, then instruction fetch and predecode stage 12 dispatches the target address specified by the branch instruction as shown in step 94. If, however, the result is a logical zero indicating that the underlying conditional test is invalid or false, then the instruction fetch predecode stage 12 increments the program counter. Accordingly, the next instruction to be received by instruction fetch and predecode stage 12 could be an instruction stream subsequent to the conditional branch instruction if the branch is not taken, or an instruction stream identified by the dispatched target address if the result is a logical one.

Figure 4A:
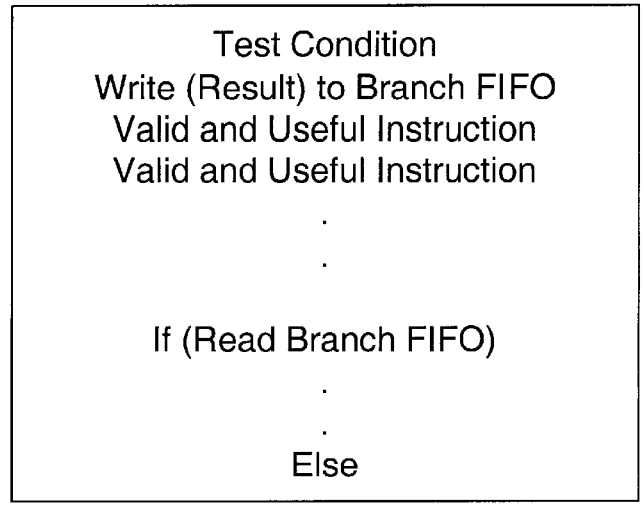
FIG. 4A represents an instruction stream containing a conditional branch for execution in the microprocessor shown in FIG. 1.

FIG. 4A shows a sequence of instructions including a conditional branch instruction (If (Read Branch FIFO)) for execution by microprocessor 10 of FIG. 1. Here the conditional branch calculation instruction is represented by a pair of sequential instructions Test Condition and Write (Result) to Branch FIFO. The Test Condition and Write (Result) to Branch FIFO are separated from the conditional branch instruction by enough valid and useful instructions to fill the pipeline. This restriction is fulfilled by the compiler upon compiling the higher level code.

Figure 4B:
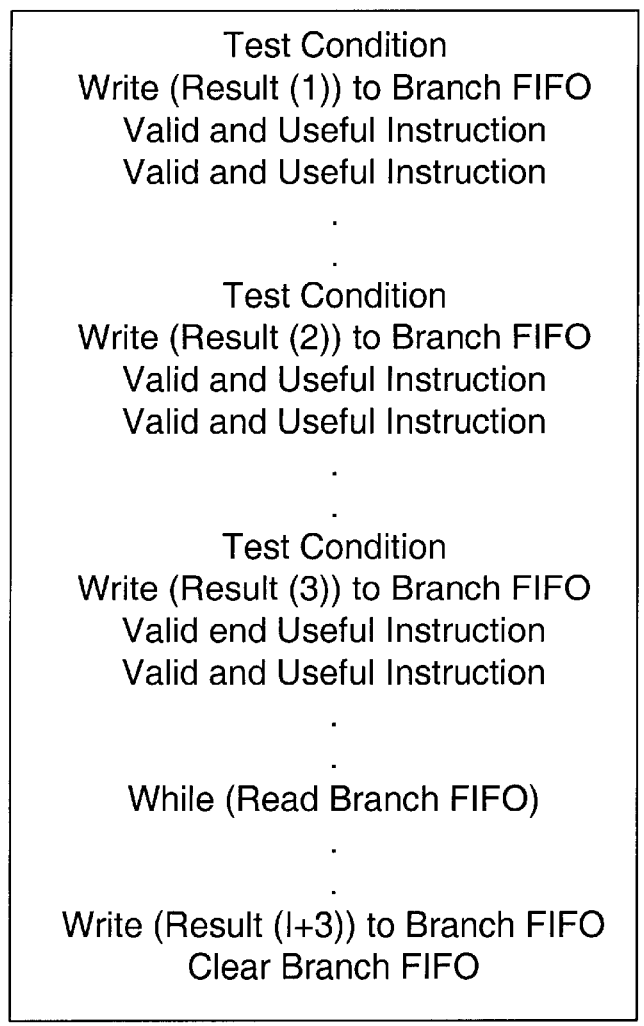
FIG. 4B illustrates an instruction stream containing a loop for execution within the microprocessor of FIG. 1.

FIG. 4B shows a stream of instructions including a loop for execution on the microprocessor 10 of FIG. 1. Executing loops are where the present invention finds its greatest advantage. A loop will have several instructions including a conditional While instruction. The condition tested is a function of the iteration (I) the loop is in. In microprocessor 10, the results of several iterations (Test Conditions) are written by Write (Result (I)) into the branch FIFO buffer before the While instruction is received by the instruction fetch and predecode stage 12. For example, if the program starts with an iteration I equal to 32, the first conditional test will be comparing I with 0 to determine whether I is equal to 0. In that the first iteration I equal to 32 is greater than 0, execution stage 16 stores the result, i.e., a logical one, within the branch FIFO buffer 30. With I equal to 31, in the next conditional branch calculation instruction, execution stage 16 again writes a logical one to branch FIFO since 31 is greater than 0. Ideally, the pipeline of microprocessor 10 should be kept full. Thus, enough independent, valid and useful instructions must be between writing the results of the first conditional test to the branch FIFO buffer and when the branch FIFO buffer is read in accordance with the While instruction.

Eventually, the loop will hit a false condition or result (i.e. logical 0) from the branch FIFO buffer at which point the loop should terminate. However, extra results of conditional branch calculation instructions may be calculated and stored in advance. In this case, it would be necessary to clear the branch FIFO buffer. This is done with the extra clear branch FIFO instruction described above.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A microprocessor configured to fetch and execute program instructions stored in memory, comprising:

a fetch and predecode stage for fetching instructions from memory at memory addresses specified by a program counter, wherein the instructions received by the fetch and predecode stage include conditional branch instructions and conditional branch calculation instructions, and wherein the fetch and predecode stage is configured to predecode the instructions to detect the conditional branch instructions;

a decode stage coupled to the fetch and predecode stage, wherein the decode stage is configured to decode conditional branch calculation instructions fetched by the fetch and predecode stage;

an execution stage coupled to the decode stage, wherein the execution stage is configured to execute conditional branch calculation instructions decoded by the decode stage;

a branch target circuit coupled to the fetch and predecode stage, wherein the branch target circuit includes a branch FIFO buffer, wherein the branch FIFO buffer is configured to receive and store execution results of executing decoded conditional branch calculation instructions;

wherein the fetch and predecode stage is configured to read an execution result from the branch FIFO buffer in response to the fetch and predecode stage predecoding a conditional branch instruction, and;

wherein the fetch and predecode stage is configured to dispatch a target address to the program counter in response to the fetch and predecode stage reading the execution result from the branch FIFO buffer.

2. The microprocessor of claim 1 wherein the execution stage is coupled to the branch FIFO buffer, and wherein the execution stage is configured to write the execution results of executing the decoded conditional branch calculation instructions to the branch FIFO buffer.

3. The microprocessor of claim 1 wherein the dispatched target address is generated in response to the conditional branch instruction fetched by the fetch and predecode stage.

4. The microprocessor of claim 1 wherein the branch FIFO buffer is configured to generate a signal indicating the branch FIFO buffer is empty.

5. The microprocessor of claim 4 wherein the branch target circuit further includes a stall circuit configured receive the signal indicating the branch FIFO buffer is empty, wherein the stall circuit generates a stall signal in response to the stall circuit receiving the signal indicating branch FIFO buffer is empty, and wherein the fetch and predecode stage is configured to delay dispatching the target address to the program counter in response to the fetch and predecode stage receiving the stall signal.

6. The microprocessor of claim 1 wherein the branch FIFO buffer is configured to generate a signal indicating the branch FIFO buffer is full.

7. The microprocessor of claim 6 wherein the branch target circuit further includes an error circuit coupled to receive the signal indicating the branch FIFO buffer is full, and wherein the error circuit is configured to generate an error signal in response receiving the signal indicating the branch FIFO buffer is full.

8. The microprocessor of claim 1 wherein the fetch and predecode stage is configured to predecode the conditional branch instruction by detecting a dedicated bit within the conditional branch instruction.

9. The microprocessor of claim 1:

wherein the instructions fetched by the fetch and predecode stage include clear branch FIFO buffer instructions, and;

wherein the branch FIFO buffer is cleared in response to the fetch and predecode stage fetching a clear branch FIFO buffer instruction.

10. The microprocessor of claim 1 wherein the execution result of executing the decoded conditional branch calculation instruction identifies whether the target address is to be dispatched by the fetch and predecode stage or whether the program counter is to be incremented to indicate the next instruction.

11. A method of operating a microprocessor comprising:

fetching a conditional branch calculation instruction from memory at a first address specified by a program counter;

decoding the conditional branch calculation instruction;

executing the decoded conditional branch calculation instruction and generating an execution result thereof;

writing the result into a branch FIFO buffer;

fetching a conditional branch instruction from memory at a second address specified by the program counter;

predecoding the conditional branch instruction to detect the conditional branch instruction;

accessing the branch FIFO buffer to read the execution result stored therein in response to predecoding the conditional branch instruction; and dispatching a target address to the program counter in response to reading the execution result stored within the branch FIFO buffer.

12. The method of claim 11 wherein target address is contained in the conditional branch instruction fetched from memory at the second address.

13. The method of claim 11 wherein the result of executing the decoded conditional branch calculation instruction determines whether the target address is to be dispatched.

14. The method of claim 11 wherein the result of executing the decoded conditional branch instruction is a single bit operand, wherein the target address is dispatched to the program counter if the result is a logical one, and wherein an instruction immediately following the conditional branch instruction is fetched if the result is a logical zero.

15. The method of claim 14 wherein executing the conditional branch calculation instruction includes comparing a pair of operands contained in registers identified by addresses within the conditional branch calculation instruction, wherein the execution result is set to logical one when the pair of operands are equal, and wherein the execution result is set to logical zero when the pair of operands are not equal.

16. The method of claim 11 further comprising generating a first signal when the branch FIFO buffer is empty.

17. The method claim 16 wherein the target address dispatch is delayed in response to the generation of the first signal.

18. The method of claim 11 further comprising clearing the branch FIFO buffer in response to dispatching the target address to the program counter.

19. The method of claim 11 wherein the result indicates whether the target address of the conditional branch instruction should be dispatched to the program counter or whether the program counter should be incremented to indicate the next instruction.

20. A method of operating a microprocessor comprising:

fetching a conditional branch instruction from memory at a first address stored in a program counter, wherein the conditional branch instruction has a dedicated bit;

accessing a FIFO buffer to read a condition test result if the dedicated bit is set and not accessing the FIFO buffer if the dedicated bit is clear, wherein the condition test result is an execution result of a conditional branch calculation instruction, and wherein the condition test result is used for determining a second address specified by the program counter;

dispatching a target address to the program counter when the condition test result read from the FIFO buffer is a first value, and;

incrementing the program counter to indicate the next instruction when the condition test result read from the FIFO buffer is a second value other than the first value.

21. The method as recited in claim 11 wherein the predecoding is accomplished by detecting a dedicated bit within the conditional branch instruction.

* * * * *